United States Patent [19]
Lesperance et al.

[11] 3,824,694
[45] July 23, 1974

[54] LENGTH MEASURING SYSTEM HAVING AUTOMATIC UPDATE OF ROLL DIAMETER COMPENSATION VALUE

[75] Inventors: Lawrence M. Lesperance, West Allis; Hugh S. Drewry; Gunars Vegners, both of Wauwatosa, all of Wis.

[73] Assignee: Allis-Chalmers Corporation, Milwaukee, Wis.

[22] Filed: Jan. 17, 1973

[21] Appl. No.: 324,345

[52] U.S. Cl. .......................... 33/141 R, 235/92 DN
[51] Int. Cl. .......................... G06m 7/00, G01b 7/04
[58] Field of Search...... 33/129, 133, 134 R, 134 A, 33/136, 142, 141 R; 235/92 DN, 92 CC, 151.32, 92 PD

[56] References Cited
UNITED STATES PATENTS

| | | | |
|---|---|---|---|
| 2,852,195 | 9/1958 | Coleman et al. | 33/129 X |
| 3,591,776 | 7/1971 | Sylvester | 33/141 R |
| 3,714,393 | 1/1973 | Johnson et al. | 235/92 DN |

*Primary Examiner*—Harry N. Haroian
*Attorney, Agent, or Firm*—Lee H. Kaiser

[57] ABSTRACT

A strip length measuring system has a pulse tachometer driven by a measuring roll engaging the strip, a presettable footage downcounter for the pulses which is preset to a roll diameter compensation factor "calibration" count representing one foot of strip held in a storage register and counts backward to zero and is reset, and a total length counter which is incremented each time the footage counter is reset. The calibration constant count is automatically determined and updated to compensate for changes in measuring roll diameter by engaging the strip with a calibration roll of accurately known diameter, accurately measuring one foot of strip by counting the pulses from a pulse tachometer driven by the calibration roll when the strip is at running speed so no slippage can occur, in a downcounter preset to a calibration setpoint count representing one foot of movement of the circumference of the calibration roll, accumulating the pulses from the measuring roll tachometer in a measuring roll upcounter while the calibration roll downcounter is counting backward to zero to measure one foot of strip, and transferring the count accumulated in the measuring roll upcounter during movement of one foot of strip to the storage register so that the footage counter is preset to the updated roll diameter compensation factor calibration count.

34 Claims, 1 Drawing Figure

LENGTH MEASURING SYSTEM HAVING AUTOMATIC UPDATE OF ROLL DIAMETER COMPENSATION VALUE

The invention relates to measurement of the length of steel strip during a rolling operation and in particular to a strip length measuring system having means to automatically compensate for variations in roll diameter.

BACKGROUND OF THE INVENTION

Steel is often sold on the basis of volume rather than by weight, and since volume is directly proportional to the length of a steel strip, it is desirable that the steel strip length be accurately measured. Accurate measurement of the length of steel strip during rolling has always been difficult. The primary source of inaccuracy in the length measurement has been in the means for converting lineal strip movement to a signal representing the distance moved by the strip. A pulse tachometer is conventionally utilized to achieve such conversion, and the pulse tachometer is driven by a measuring roll of known diameter and the pulses from the tachometer are accumulated as an indication of the length of the steel strip. Since the rolls either drive or are driven by the steel strip passing under or over the rolls, each revolution of the roll measures a length of steel equal to the circumference of the measuring roll. Since the pulse tachometer is driven by the measuring roll, a finite number of pulses are produced for each revolution of the roll.

The number of pulses which represent one foot length of the strip is determined by relating the angular rotation of the pulse tachometer with the corresponding lineal movement of the strip. Such relationship requires that the diameter of the measuring roll be accurately known since this permits the circumference of the roll, and hence the length of steel strip passing over the roll for each revolution, to be accurately determined. However, accurate measurement of roll diameter is not always possible because of roll wear and/or changes in roll diameter with roll pressure. One of the earliest methods of determining strip length was to insert a roll diameter compensation factor based upon actual diameter of the roll, but since such a compensation factor was dependent upon accurate measurement of roll diameter and accurate insertion of the compensation factor into the strip length measurement system, frequent errors in measurement occurred.

Another source of inaccuracy in measurement of steel strip length has been slippage between the roll and the steel strip during acceleration and deceleration of the mill, particularly if oil is present on the surface of the strip.

Another known strip length measurement system uses a calibration roll, or measuring wheel of known circumference which rides on the surface of the steel strip and is coupled to a pulse tachometer whose output is fed to an accumulator. This system has the advantage that the diameter of the measuring wheel does not change, but the measuring wheel has inertia and slippage occurs between it and the steel strip during acceleration and deceleration of the mill with consequent inaccuracy in length measurement.

OBJECTS OF THE INVENTION

It is an object of the invention to provide an improved strip length measurement method and system which obviates the above disadvantages of prior art systems and accurately measures the length of steel strip passing through a rolling mill regardless of slippage or changes in roll diameter resulting from such causes as wear or variation in roll pressure.

Another object of the invention is to provide an improved strip length measuring system and method which automatically compensate for variations in roll diameter by accurately and automatically determining the roll diameter compensation factor calibration count to which the unit length counter is preset.

Still another object of the invention is to provide an improved length measuring system and method which automatically updates the roll diameter compensation factor count and determines the measured length of the strip just as if the new calibration constant had been used from the initial entry of the strip into the rolling mill.

SUMMARY OF THE INVENTION

A strip length measuring system embodying the invention has a pulse tachometer driven by a measuring roll engaging the strip, a presettable footage downcounter for the pulses which is preset to a roll diameter compensation factor, or calibration constant count representing one foot of strip held in a calibration constant storage register and counts backward to zero and is reset, and a total length counter which is incremented each time the footage downcounter proceeds backward to zero and is reset to the calibration constant count. The calibration constant is accurately determined by counting the number of pulses from the measuring roll tachometer which represents one foot of strip. A calibration roll of accurately known diameter engages the strip and drives a calibration roll tachometer whose output pulses are accumulated by a presettable calibration roll pulse counter which is preset to a calibration setpoint count representing one foot of movement of the circumference of the calibration roll. When the strip reaches countout speed so that no slippage can occur between roll and strip, counting is simultaneously initiated of pulses from the calibration roll tachometer by the preset calibration roll counter and of pulses from the measuring roll tachometer by a measuring roll upcounter. The number of pulses from the measuring roll tachometer accumulated by the measuring roll upcounter during the interval that the calibration roll downcounter is preceeding backward to zerto to measure one foot of strip constitutes the calibration constant, and each time a new value is determined by the measuring roll upcounter, it is compared with the previously determined value. If the same number of pulses is accumulated by the measuring roll upcounter during a plurality of successive one foot measurements by the calibration roll downcounter, it is assumed that no slippage is occurring, and the count accumulated in the measuring roll upcounter is transferred to the calibration constant storage register as an updated roll diameter compensation factor count to which the footage counter is preset, thereby completing the calibration.

An up-down counter begins to accumulate pulses from the measuring roll pulse tachometer when the strip enters the rolling mill. When calibration is achieved, an "updated footage downcounter" is preset to the new roll diamter compensation factor count, the up-down counter is stopped from counting up, and both the up-down counter and the "updated footage downcounter" are decremented by pulses from a pulse clock whose frequency is higher than that of the pulses from the measuring roll tachometer. Each time the "updated footage counter" proceeds backwards to zero, it increments an "updated total footage counter" and is reset to the updated roll diameter compensation factor count held in the calibration constant storage register. Pulses from the measuring roll tachometer also decrement the "updated footage downcounter." When the up-down counter proceeds backwards to zero, decrementing of the "updated footage counter" by the clock pulses is stopped, but the measuring roll pulse tachometer pulses continue to decrement the "updated footage counter." The "updated total footage counter" thus contains a count representing measured length of the strip just as if the new roll diameter compensation factor count had been used since the strip initially entered the rolling mill.

DESCRIPTION OF THE DRAWING

These and other objects and advantages of the invention will be more readily apparent from the following detailed description when considered in conjunction with the accompanying drawing in which the single FIGURE is a block diagram of a strip length measuring system embodying the invention.

DETAILED DESCRIPTION

Figure 1:
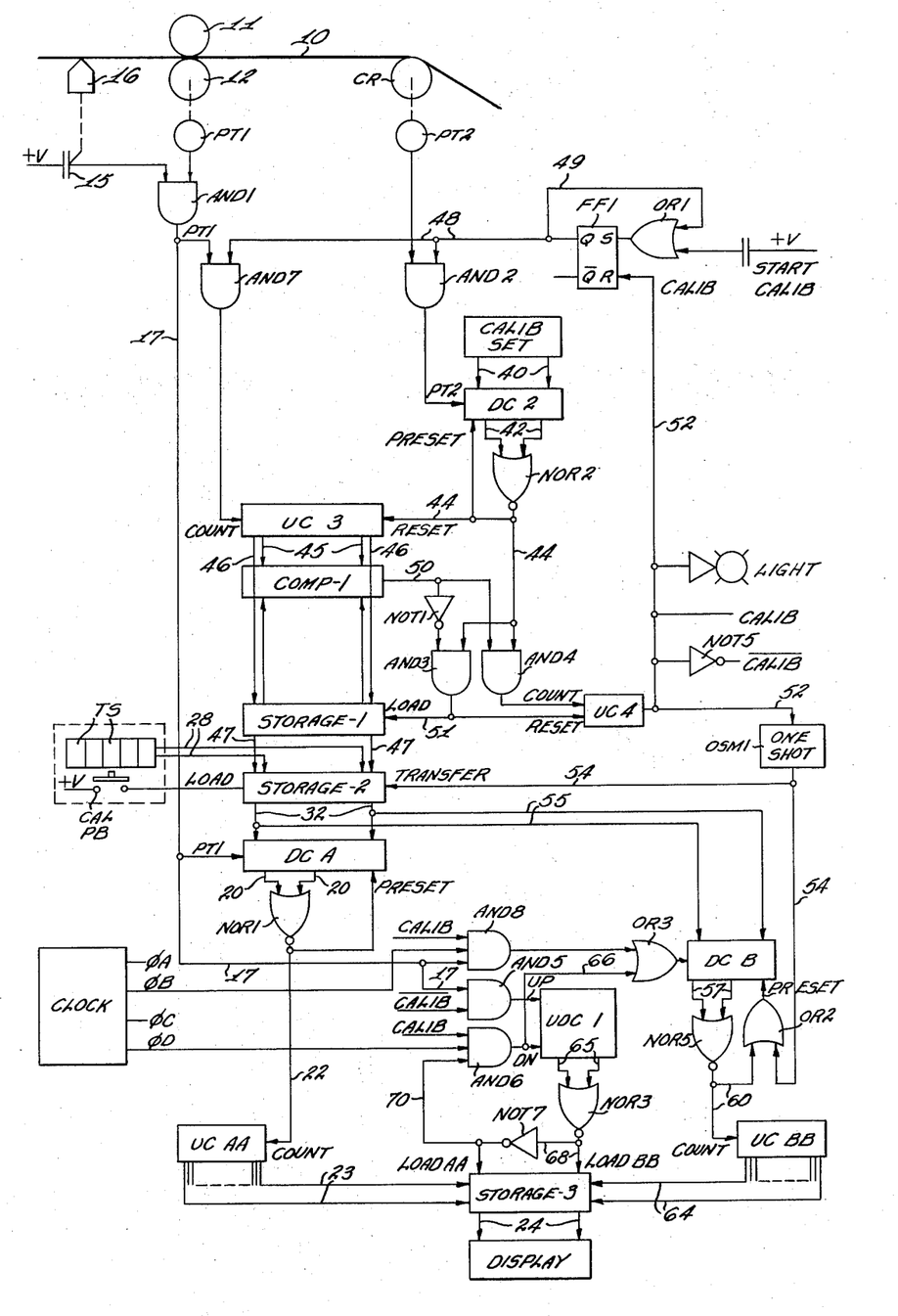

Although our invention may be ideally used with a digital computer, it will be illustrated and described as embodied in a hard-wire length measuring system for a steel strip passing through a rolling mill to better illustrate the relationship of the components.
Length Measuring System Referring to the drawing, a steel strip 10 whose length is to be measured passes between a pair of reducing rolls 11 and 12. The lower roll 12 is also a measuring roll and is operatively connected to a measuring roll pulse tachometer PT1. The pulses from measuring roll pulse tachometer PT1 are fed to one input of an AND gate AND 1 whose other input is connected to one of a pair of normally open contacts 15 of a metal detector 16 positioned upstream from rolls 11 and 12 adjacent the entrance to the rolling mill. The other contact is connected to a source of logic 1 voltage designated +V, and when metal strip 10 enters the rolling mill, metal detector 16 closes contact 15 to thereby connect logic 1 voltage to one input of gate AND 1 to permit counting to begin.

The output from gate AND 1 is coupled over a conductor 17 to a unit length downcounter, or register DCA which is preferably of the presettable binary coded decimal (BCD) type comprising a plurality of flip-flop stages (not shown) and which can be preset to a desired count and count backwards, or down, to zero and be reset. Downcounter DCA counts the number of pulses from measuring roll tachometer PT1 representing the smallest increment of strip 10 required for display, i.e., the pulses equivalent to a one foot length of strip 10, and then is reset. The Q output (not shown) from each flip-flop stage of downcounter DCA may be coupled (or only the least significant digit stage may be coupled) over a conductor 20 to an input of a NOR gate NOR 1. Each flip-flop stage of downcounter DCA may be connected to a stage of a calibration constant storage register STORAGE 2 which holds the roll diameter compensation factor count, termed "calibration constant" (the number of pulses from measuring roll tachometer PT1 representing one foot of strip).

The output from gate NOR 1 is coupled over a conductor 22 to a total footage upcounter UCAA which preferably is a five-stage binary coded decimal counter and accumulates each pulse representing one foot of strip length generated by gate NOR 1 when counter DCA counts down to zero. The logic 1 output from gate NOR 1 increments upcounter UCAA one count and also is coupled to a preset input to downcounter DCA to reset downcounter DCA to the roll diameter compensation factor value stored in register STORAGE 2. The count accumulated in total footage upcounter UCAA representing strip length in feet is transferred to a storage register, or accumulator STORAGE 3 having the individual flip-flop stages thereof (not shown) connected over conductors 23 to the corresponding stages of total footage upcounter UCAA when the storage register receives a logic 1 pulse from an inverter, or NOT gate NOT 7 on its LOAD AA input as described hereinafter. The individual stages of register STORAGE 3 may be coupled over conductors 24 to the corresponding stages of a suitable five-decade readout unit DISPLAY which shows the total footage count stored in upcounter UCAA.

A roll diameter compensation factor value, or calibration constant, to correct for variations in roll diameter may be manually entered into the length measuring system on a switch register comprising a plurality of conventional thumbwheel, computer-coded switches TS of the type available commercially from the Digitran Company of Pasedena, Calif. Four or five thumbwheel switches TS may be used depending upon the desired accuracy and length of strip, and each switch TS may have a manually rotatable cogged wheel (not shown) bearing the indicia 0 through 9, and the switch may provide binary (i.e., 0 or 1) voltages on four output conductors 28 for each stage representing the decimal to which the cogged wheel has been manually rotated in the binary coded decimal (BCD) code. The output conductors 28 (only two being shown) from thumbwheel switches TS are coupled to the calibration constant storage register STORAGE 2 which stores the roll diameter compensation value (the nuber of pulses from measuring roll tachometer PT1 representing one foot of strip). A calibration pushbutton CAL-PB may be provided for manually loading the roll diameter compensation value set on thumbwheel switches TS into storage register STORAGE 2. Pushbutton CAL-PB when operated closes a set of normally open contacts to connect the voltage source +V to a load input to storage register STORAGE 2 to transfer the roll diameter compensation factor value entered manually on thumbwheel switches TS into register STORAGE 2.

The roll diameter compensation factor value which is manually entered into the thumbwheel switches TS is determined by relating the angular rotation of measuring roll pulse tachometer PT1 with the corresponding movement of steel strip 10. The number of pulses from pulse tachometer PT1 representing one foot of strip movement (and thus one foot of circumference of measuring roll 12) becomes the initial calibration constant and is manually entered on thumbwheel switches TS.

When strip 10 enters between reducing rolls 11 and 12, each pulse from pulse tachometer PT1 enables gate AND 1 and provides a pulse over conductor 17 that decrements unit length downcounter DCA, i.e., causes it to count backward, one count. After unit length downcounter DCA counts down to zero, (i.e., counts backward the number of pulses corresponding to one foot of strip represented by the calibration constant) the outputs from all the stages of downcounter DCA on conductors 20 become logic 0. The resulting pulse from gate NOR 1 on conductor 22 increments total length upcounter UCAA by one to indicate another foot of strip 10 passing over roll 12 and also presets unit length downcounter DCA to the calibration constant stored in storage register STORAGE 2. As the total footage upcounter UCAA accumulates the one foot pulses from unit length downcounter DCA, the total footage value is stored in accumulator storage 3 and displayed on readout unit DISPLAY.

Automatic Calibration

The roll diameter compensation factor value, or calibration constant entered on thumbwheel switches TS requires that the diameter of measuring roll 12 be accurately known, but this is not always possible when the roll diameter changes. Our length measuring system accurately determines the calibration constant with which to preset the compensation counter DCA on a routine basis and does so when the mill is at running speed so no slippage is occurring and also measures strip length with such updated roll diameter compensation factor. Stated in another way, our invention accurately and automatically determines the number of pulses from the measuring roll tachometer PT1 which represents one foot of strip 10 and automatically calibrates the length measuring system with the updated value.

A calibration roll, or measuring wheel CR which has been precisely manufactured to a known diameter, bears against, and is driven by, steel strip 10 and is coupled to a calibration roll pulse tachometer PT2. The output from calibration roll pulse tachometer PT2 is used to accurately measure passage of one foot of strip 10. In order to achieve automatic calibration, the rolling mill must be running at a constant speed which eliminates the possibility of slippage occurring at the calibration roll CR.

Pulse tachometer PT2 is connected to one input of an AND gate AND 2 whose output is coupled to a calibration roll downcounter, or register DC2 preferably of the presettable binary coded decimal (BCD) type which counts pulses from pulse tachometer PT2 when gate AND 2 is enabled.

A plurality of calibration setpoint switches, termed a switch register, may be similar to the thumbwheel switches TS and is shown by the rectangle designated CALIB SET. Thumbwheel switches CALIB SET permit manual entering of a calibration setpoint value in binary coded decimal form equal to the number of pulses generated by pulse tachometer PT2 corresponding to one foot of movement of strip 10 when the rolling mill is at running speed so that no slippage is occurring between strip 10 and calibration roll CR. The calibration setpoint value in BCD code entered manually and held on switches CALIB SET is coupled over conductors 40 to the calibration roll downcounter DC2 and is the value to which the downcounter DC2 is preset each time it counts down to zero. The flip-flop stage (not shown) of downcounter DC2 may be coupled over conductors 42 to a NOR gate NOR 2, and when downcounter DC2 has counted backward to zero, each flip-flop stage provides a logic 0 on the corresponding lead 42 so that gate NOR 2 provides a logic 1 "unit distance" signal on a conductor 44 which is applied to a preset input to downcounter DC2 and resets it to the calibration setpoint value manually entered on switches CALIB SET.

The output of gate AND 1 is coupled to one input of an AND gate AND 7 whose output is connected to a measuring roll upcounter, or register UC3 which is preferably of the BCD type so that upcounter UC3 counts the pulses from measuring roll pulse tachometer PT1 when gates AND 1 and AND 7 are enabled, or open. The unit distance signal output of gate NOR 2 is coupled over a conductor 44 to a reset input of measuring roll pulse upcounter UC3 so that upcounter UC3 is reset to zero each time calibration roll downcounter DC2 measures one foot length of strip 10 by mounting backwards the number of pulses corresponding to the calibration setpoint to zero.

The flip-flop stages of upcounter UC3 may be coupled over conductors 45 to a comparator, or coincidence detector COMP 1 and are also coupled over conductors 46 to the corresponding flip-flop stages of a "temporary" storage register STORAGE 1. The flip-flop stages of storage register STORAGE 1 are coupled over conductors 47 to corresponding flip-flop stages of calibration constant storage register STORAGE 2.

A pair of interlock START CALIB contacts are closed when the rolling mill reaches a constant speed (for example, when the rolling mill is in the HOLD condition) to connect logic 1 voltage designated +V to one input of an OR gate OR 1 whose output is coupled to the set input S of a flip-flop FF 1. The Q output of flip-flop FF1 is coupled over a conductor 48 to one input of gate AND 2 and over a conductor 49 to a second input of gate OR 1. The logic 1 output from gate OR 1 when the START CALIB contacts close sets flip-flop FF1 with logic 1 voltage on its Q output so that the logic 1 on conductor 48 enables gates AND 2 and AND 7 and downcounter DC2 can begin to count pulses from calibration roll pulse tachometer PT2 and upcounter UC3 can simultaneously begin to accumulate pulses from measuring roll pulse tachometer PT1. The logic 1 on conductor 49 results in a logic 1 output from gate OR 1 so that flip-flop FF1 is held in the set condition if the START CALIB contacts open.

Calibration roll pulse downcounter DC2 is preset with the number of pulses from the calibration roll pulse tachometer PT2 representing one foot of strip (i.e., the calibration setpoint held in thumb switches CALIB SET, and while calibration roll pulse downcounter DC2 is counting backwards to zero to measure one foot of strip 10, measuring roll pulse upcounter UC3 is totaling the pulses from the measuring roll pulse tachometer PT1.

Each time a new calibration constant value is determined by measuring roll pulse upcounter UC3 (the number of pulses accumulated from measuring roll tachometer PT1 while calibration roll pulse downcounter DC2 is measuring one foot of strip) it is compared to the previous value stored in temporary register STORAGE 1. If the two values are similar three consecutive times, it is assumed that no slippage is occurring and the new calibration constant is transferred to calibration constant storage register STORAGE 2. Coincidence detector COMP 1 compares the number of pulses from measuring roll pulse tachometer PT1 accumulated in upcounter UC3 during passage of one foot of strip with the previously determined roll diameter compensation factor, or calibration constant held in temporary storage register STORAGE 1. If downcounter DC2 measures one foot of strip by counting down to zero before upcounter UC3 accumulates the number of pulses from measuring roll tachometer PT1 equal to the roll diameter compensation factor value held in temporary storage register STORAGE 1, the logic 1 unit distance signal from gate NOR 2 on conductor 44 will result in transferring the pulse count accumulated in upcounter UC3 to temporary storage register STORAGE 1, will reset downcounter DC2 to the value preset in switches CALIB SET, and will reset upcounter UC3 to 0, and the apparatus will begin again to measure one foot of movement of strip 10. The output of coincidence detector COMP 1 is coupled to the input of an inverter, or NOT gate NOT 1 whose output is connected to one input of an AND gate AND 3. The other input of gate AND 3 is connected by conductor 44 to the output of gate NOR 2. The "non-compare" signal output of gate AND 3 is connected by a conductor 51 to a LOAD input of temporary storage register STORAGE 1 and to a RESET input of an upcounter, or register UC4 which is adapted to provide a logic 1 "running speed" signal on a conductor 52 after it has counted up to 3.

If downcounter DC2 measures one foot of lineal movement of strip 10 by counting backward to zero before measuring roll pulse upcounter UC3 accumulates a number of pulses equal to the previously determined roll diameter compensation factor value held in temporary storage register STORAGE 1, the resulting logic 0 output from coincidence detector COMP 1 is converted by gate NOT 1 to a logic 1 input to gate AND 3 which opens when gate NOR 2 provides logic 1 unit distance signal on conductor 44, and gate AND 3 provides logic 1 non-compare signal on conductor 51 which transfers the contents of upcounter UC3 into temporary storage register STORAGE 1 and also resets upcounter UC4 to zero. The logic 1 unit distance signal output from gate NOR 2 on conductor 44 when downcounter DC2 counts back to zero resets upcounter UC3 to zero and also presets downcounter DC2 to the calibration setpoint value set in thumbwheel switches CALIB SET.

If the number of pulses accumulated by measuring roll pulse upcounter UC3 during one foot of movement of strip 10 is equal to the previously determined roll diameter compensation factor value held in temporary storage register STORAGE 1, coincidence detector COMP 1 will provide a logic 1 pulse on conductor 50 which is connected to the input of gate NOT 1 and also to one input of an AND gate AND 4 whose other input is coupled to conductor 44 and the output from gate NOR 2. The resulting logic 0 output from gate NOT 1 provides logic 0 voltage from gate AND 3 on conductor 51 to the LOAD input of temporary storage register STORAGE 1 so that the contents of upcounter UC3 are not transferred to temporary register STORAGE 1. The logic 1 on conductor 50 from coincidence detector COMP 1 and the logic 1 unit distance signal on conductor 44 when downcounter DC2 counts back to zero results in a logic 1 "compare" signal output from gate AND 4 which is applied to a COUNT input to running speed signal upcounter UC4 and increments it one count.

Thus each time measuring roll pulse tachometer UC3 determines a new roll diameter calibration factor value, or calibration constant, during passage of one foot of strip 10, such value accumulated in upcounter UC3 is checked against the previous value held in temporary register STORAGE 1 for comparison. If the two counts are equal three consecutive times, it is assumed that no slippage is occurring between strip 10 and measuring roll 12. Consequently the roll diameter compensation value stored in temporary storage register STORAGE 1 is transferred to calibration constant register STORAGE 2 and accepted as the number of pulses from measuring roll pulse tachometer PT1 representing one foot of strip for measurement of length. Upcounter UC4 is preferably of the binary type which provides a "running speed" signal output on conductor 52 when it has accumulated a count of three. The logic 1 running speed signal on conductor 52 turns on a calibration indicating light LIGHT and is also applied to the reset input R to flip-flop FF1 to cause it to change states and provide logic 0 on its Q output and on conductor 48 so that gates AND 2 and AND 7 are disabled and calibration is stopped. The logic 1 voltage on lead 52 is applied to a CALIB conductor which is coupled to the inputs of gates AND 6 and AND 8 as described hereinafter and is also applied to the input of an inverter NOT 5 which provides logic 0 on the $\overline{\text{CALIB}}$ lead to one input to a gate AND 5. The logic 1 on conductor 52 also actuates a one-shot multivibrator OSM1 which applies a square wave pulse on a conductor 54 connected to the TRANSFER input to calibration constant storage register STORAGE 2 and causes the contents of register STORAGE 1 to be transferred to register STORAGE 2 as the new, or updated, roll diameter compensation factor, or calibration constant, i.e., the number of pulses from measuring roll tachometer PT1 representing one foot of strip 10.

Automatic Update of Measured Length

The individual flip-flop stages of calibration constant register STORAGE 2 may be connected by conductors 55 to the corresponding stages of an "updated unit length" presettable downcounter DCB. The flip-flop stages of downcounter DCB may be coupled by conductors 57 to the inputs of a NOR gate 5, and the output of gate NOR 5 on conductor 60 is connected to one input of an OR gate OR 2 whose output is connected to a PRESET input to downcounter DCB. The other input to gate OR 2 is over a conductor 54 from the one-shot multivibrator OSM1.

A logic 1 pulse on the PRESET input to updated unit length downcounter DCB presets it to the roll diameter compensation factor value, or calibration constant held in storage register STORAGE 2. A pulse is applied to the PRESET input to downcounter DCB by gate OR 2 when: (a) calibration is achieved and one-shot multivibrator OSM1 provides an output pulse on lead 54 or (2) downcounter DCB counts down to zero so that gate NOR 5 provides an output pulse on conductor 60. The output from gate NOR 5 on conductor 60 is applied to a COUNT input to an "updated total footage" upcounter UCBB so that it proceeds forward one count each time downcounter DCB counts from the preset calibration constant count backwards to zero. The contents of upcounter UCBB representing total footage are transferred over conductors 64 to the storage register STORAGE 3 when a logic 1 pulse is applied to the LOAD BB input of register STORAGE 3 as described hereinafter.

From the start of counting, as permitted by closure of contacts 15 of metal detector 16, an up-down register, or counter UDC1 accumulates pulses from the measuring roll tachometer PT1. The pulses from tachometer PT1 pass successively through gate AND 1, conductor 17, and gate AND 5 to the UP input of up-down counter UDC1 to cause it to proceed forward. The measuring roll tachometer pulses over lead 17 are coupled to one input of gate AND 5, and its other input designated $\overline{CALIB}$ receives logic 1 from inverter, or NOT gate NOT 5 until calibration is achieved and up-counter UC4 provides a logic 1 running speed signal output on conductor 52. Thus the pulses from measuring roll tachometer PT1 pass through gate AND 5 to the up input to up-down counter UDC1 and cause it to proceed forward until calibration is achieved. The flip-flop stages of up-down counter UDC1 may be individually coupled over conductors 65 to the inputs of a NOR gate NOR 3 so that it provides a logic 0 output while an integer count is stored in register UDC 1 and provides a logic 1 output when up-down counter UDC1 has counted backwards to zero.

Pulses from one phase $\phi D$ of a system pulse clock CLOCK having a frequency higher than that of pulses from measuring roll tachometer PT1 are coupled through gate AND 6 to the DOWN input to up-down counter UDC1 to cause it to proceed backward. A second input to gate AND 6 is from the CALIB lead coupled to conductor 52 so that logic 0 is applied thereto (and no pulses from the clock pass through gate AND 6) until calibration is achieved. A third input to gate AND 6 is from the output of an inverter, or NOT gate NOT 7 having its input coupled to the output from gate NOR 3. The logic 0 output from gate NOR 3 while an integer count is held in up-down counter UDC1 is converted to logic 1 by gate NOT 7 so that gate AND 6 is opened by each pulse from phase $\phi D$ of the pulse clock CLOCK after calibration is achieved to decrement up-down counter UDC1.

The output from gate AND 6 is coupled over a conductor 66 to one input of an OR gate OR 3 having its output coupled to a COUNT input to updated unit length presettable downcounter DCB. When calibration is achieved, upcounter UC4 provides logic 1 running speed signal on conductor 52 which is converted by gate NOT 5 to logic 0 on the $\overline{CALIB}$ lead so that gate AND 5 is disabled and up-down counter UDC1 is stopped from counting up. The logic 1 on lead 52 is also applied to the CALIB lead to enable gate AND 6 each time a pulse from phase $\phi D$ of the pulse clock is received so that up-down counter UDC1 is started counting down. The same clock pulses $\phi D$ are used to decrement downcounter DCB which was preset with the newly determined calibration constant (equal to the number of pulses from measuring roll tachometer PT1 for each foot of strip) when one-shot multivibrator OSM1 provided a square wave pulse on conductor 54 at the instant calibration was achieved. Each time downcounter DCB is counted from the preset calibration constant back to zero gate NOR 5 provides a pulse on conductor 60 which increments "updated total footage upcounter" UCBB one count and also provides a logic 1 pulse from gate OR 2 which again presets up-dated footage downcounter DCB to the calibration constant value held in register STORAGE 2. Such counting continues until up-down counter UDC1 reaches zero, at which time updated total length upcounter UCBB has accumulated the number of pulses equal to the measured length of strip 10 just as if the new calibration constant has been used from the beginning of counting. When up-down counter UDC1 counts backwards to zero, gate NOR 3 provides logic 1 on conductor 68 which is applied to the LOAD BB input to storage register STORAGE 3 and transfers the contents of upcounter UCBB to register STORAGE 3 as the updated measured value of strip length, and this footage is shown on the readout visual indicator DISPLAY. The logic 1 on conductor 68 is converted to logic 0 on conductor 70 by gate NOT 7 to thereby disable gate AND 6 and stop up-down counter UDC1 from proceeding backward.

Pulses from the measuring roll tachometer PT1 on lead 17 are applied to one input of gate AND 8 having a second input coupled to the CALIB lead and a third input coupled to a phase $\phi B$ output from the pulse clock CLOCK. Since the pulse clock frequency is much higher than that of the pulse from tachometer PT1, gate AND 8 is enabled by each pulse from the measuring roll tachometer PT1 after calibration is achieved to generate a logic 1 pulse which passes through gate OR 3 to decrement downcounter DCB. Pulses from measuring roll tachometer PT1 now decrement downcounter DCB both while up-down counter UDC 1 is counting backwards to zero and also subsequent thereto when gate AND 6 is opened to stop counting by up-down counter UDC1. Downcounter DCB is preset to the updated calibration constant value held in register STORAGE 2 each time it counts back to zero, and the contents of updated total length upcounter UCBB thus accurately indicate the length of the strip 10 for the remainder of the coil just as if the updated calibration constant had been used from the beginning of counting, and such measured length is shown on visual readout indicator DISPLAY.

In an alternative embodiment of the invention a desired length of steel strip is preset on thumbwheel switches (or programmed into a digital computer) which are coupled to a comparator that compares the preset length setpoint with the total footage count accumulated in upcounter UCBB, and when the two values are equal a command is issued to slow the mill down and cut the steel strip.

While only a single embodiment of the invention has been illustrated and described in detail, it should be understood that we do not intend to be limited to the single embodiment for many variations and modifications thereof will be obvious to those skilled in the art.

The embodiments of the invention in which an exclusive property or privilege is claimed are defined as follows:

1. In a strip length measuring system having a measuring roll engaging the strip operatively connected to a measuring roll pulse tachometer, a preset unit length counter for the pulses from said measuring roll pulse tachometer, a total length counter, and means for resetting said unit length counter to its initial state and for incrementing said total length counter each time said unit length counter counts to a predetermined roll diameter compensation factor count preset therein representing movement of said strip through a unit distance, the improvement comprising:
a measuring roll pulse counter for counting the pulses from said measuring roll pulse tachometer,
measuring means for providing a unit distance signal when said strip moves through said unit distance,
means responsive to said strip reaching a constant speed for simultaneously actuating said measuring means and initiating counting by said measuring roll pulse counter, and
means for changing said predetermined roll diameter compensation factor count preset in said unit length counter to the count accumulated in said measuring roll pulse counter during the interval between acutation of said measuring means and generation of said unit distance signal as an updated roll diameter compensation factor.

2. In a strip length measuring system in accordance with claim 1 wherein said measuring means includes
a calibration roll in contact with said strip,
a calibration roll pulse tachometer operatively connected to said calibration roll,
a preset calibration roll counter for the pulses from said calibration roll pulse tachometer and being preset in response to said unit distance signal to a calibration setpoint count equal to the number of pulses generated by said calibration roll pulse tachometer when the circumference of said calibration roll moves said unit distance, and
means for deriving said unit distance signal when said calibration roll pulse counter has counted to said preset count.

3. In a strip length measuring system in accordance with claim 2 wherein said roll diameter compensation factor count to which said unit length counter is preset is held in a calibration constant storage register coupled to said unit length counter, said means responsive to said strip reaching constant speed includes means for simultaneously initiating counting by said measuring roll pulse and calibration roll pulse counters, and including
means for transferring the count accumulated in said measuring roll pulse counter to said calibration constant storage register as an updated roll diameter compensation factor.

4. In a strip length measuring system in accordance with claim 3 and including
means for providing a running speed signal when said strip has reached running speed, and wherein said means for transferring said count is responsive to said running speed signal to load the contents of said measuring roll pulse counter into said calibration constant storage register.

5. In a strip length measuring system in accordance with claim 4 wherein said means for providing a running speed signal includes means for sensing when the count accumulated in said measuring roll pulse counter during the interval said calibration roll counter counts to said preset count is substantially the same for a predetermined number of successive measurements by said unit distance measuring means.

6. In a strip length measuring system in accordance with claim 5 wherein said means for sensing similar successive counts includes
a temporary storage register,
a preset similar count register adapted to generate said running speed signal when it counts to a preset value,
means for comparing the counts in said measuring roll pulse counter and said temporary storage register each time said unit distance signal is derived and for generating a compare signal when said counts are similar and a non-compare signal when they are dissimilar,
means responsive to said non-compare signal to transfer the contents of said measuring roll pulse counter to said temporary storage register,
means responsive to said compare signal for incrementing said preset similar count register, and
means responsive to said running speed signal for transferring the contents of said temporary storage register to said calibration constant storage register as an updated roll diameter compensation factor.

7. In a strip length measuring system in accordance with claim 6 wherein said means for comparing counts includes a coincidence detector for generating a similar count signal when the counts in said measuring roll pulse counter and said temporary storage register are substantially the same, and
a first AND gate receiving said similar count signal and said unit distance signal as inputs and having its output coupled to one input of said preset similar count register, whereby said similar count register is incremented each time said measuring roll pulse counter accumulates the same number of pulses during successive movements of said strip through said unit distance.

8. In a strip length measuring system in accordance with claim 7 wherein said count comparing means also includes a second AND gate receiving said unit distance signal on one input and adapted to generate said non-compare signal,
inverter means including a NOT gate for coupling said similar count signal to another input of said second AND gate, and
means coupled to the output of said second AND gate and being responsive to said non-compare output signal therefrom for transferring the contents of said measuring roll pulse counter to said temporary storage register.

9. In a strip length measuring system in accordance with claim 8 and including means responsive to said running speed signal for transferring the count stored in said temporary storage register into said calibration constant storage register as an updated work roll compensation factor.

10. In a strip length measuring system in accordance with claim 2 wherein said calibration roll pulse counter is a presettable downcounter and including calibration setpoint means for holding said calibration setpoint count and being coupled to said presettable calibration roll downcounter, and said means for deriving said unit distance signal includes gate means coupled to said presettable calibration roll downcounter for generating said unit distance signal when said presettable downcounter has preceeded backward to zero.

11. In a strip length measuring system in accordance with claim 1 and including
an up-down counter, means responsive to a strip entering said system for incrementing said up-down counter with the pulses from said measuring roll tachometer, an updated unit length counter, means to reset said updated unit length counter to its initial state each time it accumulates the number of pulses counted by said measuring roll pulse counter during movement of said strip through said unit distance, a total length register connected to be incremented each time said updated unit length counter is reset, a pulse clock, means responsive to said strip reaching running speed for stopping incrementing of said up-down counter by pulses from said measuring roll tachometer and for decrementing said up-down counter by pulses from said clock and for also initiating accumulation by said updated unit length counter of both pulses from said clock and pulses from said measuring roll tachometer, and means responsive to said up-down counter proceeding backwards to zero to stop accumulation of clock pulses by said updated unit length counter.

12. In a strip length measuring system in accordance with claim 11 wherein said updated unit length counter is a presettable downcounter and said means to reset said updated unit length downcounter presets it to said number of pulses counted by said measuring roll pulse counter during movement of said strip through said unit distance each time said presettable downcounter proceeds backward to zero.

13. In a strip length measuring system in accordance with claim 1 and including an up-down counter, means responsive to said strip entering said length measuring system for incrementing said up-down counter with pulses from said measuring roll pulse tachometer, a presettable updated unit length downcounter, means to preset said downcounter each time it proceeds backward to zero the number of pulses counter by said measuring roll pulse counter during movement of said strip through said unit distance representing an updated roll diameter compensation factor, a total length register connected to be incremented each time said downcounter is preset, a pulse clock, means responsive to said strip reaching running speed for stopping incrementing of said up-down counter and for decrementing said up-down counter with pulses from said clock, means responsive to said strip reaching running speed for decrementing said presettable unit length downcounter with both pulses from said clock and pulses from said measuring roll tachometer, and a total length readout device coupled to said total length register.

14. In a strip length measuring system having a measuring roll engaging the strip operatively connected to a measuring roll pulse tachometer, a presettable unit length downcounter for accumulating the pulses from said measuring roll pulse tachometer, a calibration constant storage register coupled to said unit length downcounter for holding the roll diameter compensation factor count, a total length counter, means responsive to said length downcounter proceeding backward to zero for incrementing said total length counter and for resetting said unit length downcounter to the roll diameter compensation factor count held in said calibration constant storage register, means including a calibration roll in contact with said strip and a calibration roll pulse tachometer operatively connected to said calibration roll for measuring movement of said strip through unit distance and for generating a unit distance signal when said strip has moved said unit distance, a measuring roll pulse counter for the pulses from said measuring roll pulse tachometer and being connected to stop counting in response to said unit distance signal, means responsive to said strip reaching constant speed for actuating said unit distance measuring means and initiating counting by said measuring roll pulse counter, and means for transferring the count accumulated in said measuring roll pulse counter to said calibration constant storage register as an updated roll diameter compensation factor.

15. In a strip length measuring system in accordance with claim 14 wherein said unit distance measuring means also includes a calibration roll pulse counter for the pulses from said calibration roll pulse tachometer, calibration setpoint means for holding a calibration setpoint count representing the number of pulses generated by said calibration roll pulse tachometer during movement of the circumference of said calibration roll through unit distance, and means responsive to said calibration roll pulse counter proceeding to said calibration count held in said calibration setpoint means for generating said unit distance signal and for resetting said calibration roll pulse counter to its initial state.

16. In a strip length measuring system in accordance with claim 15 and including means responsive to said measuring roll pulse counter accumulating approximately the same number of pulses a plurality of successive times for generating a running speed signal, and wherein said means for transferring is operated by said running speed signal.

17. In a strip length measuring system in accordance with claim 16 wherein said means for generating a running speed signal includes a temporary storage register, comparator means for comparing the count held in said measuring roll pulse counter each time said unit distance signal is generated with the count held in said temporary storage register and for generating compare and non-compare signals respectively when said counts are similar and dissimilar, running speed signal counter means for generating said running speed signal when counted forward to a predetermined count, means responsive to said non-compare signal for loading the contents of said measuring roll pulse counter into said temporary storage register and for resetting said running speed signal counter means to its initial state, means responsive to said compare signal for incrementing said running speed signal counter means one count, and means responsive to said running speed signal for transferring the contents of said temporary storage register to said calibration constant storage register.

18. In a strip length measuring system in accordance with claim 17 and including a presettable updated unit length downcounter,
an up-down counter,
means responsive to said strip entering said length measuring system for incrementing said up-down counter with pulses from said measuring roll pulse tachometer, means responsive to said running speed signal for presetting said updated unit length downcounter with the count held in said calibration constant storage register, an updated total length counter, means responsive to said updated unit length downcounter proceeding backward to zero to increment said undated total length counter and to reset said updated unit length downcounter to the count held in said calibration constant storage register, a pulse clock, means responsive to said running speed signal for stopping incrementing of said up-down counter and for initiating decrementing of said up-down counter by the pulses from said clock, means responsive to said running speed signal for decrementing said updated unit length downcounter with pulses from said clock and also with pulses from said measuring roll pulse tachometer, means responsive to said up-down counter proceeding backward to zero for stopping decrementing of said up-down counter and said updated unit length downcounter with pulses from said clock, and a readout device for the contents of said updated total length counter.

19. In a strip length measuring system having a measuring roll engaging the strip operatively connected to a measuring roll pulse tachometer, a presettable unit length downcounter for the pulses from said measuring roll pulse tachometer, a total length counter, means for incrementing said total length counter and for presetting said unit length downcounter to a roll diameter compensation factor count each time it proceeds backward to zero, a measuring roll pulse counter for counting the pulses from said measuring roll pulse tachometer, a calibration roll in contact with said strip, a calibration roll pulse tachometer operatively connected to said calibration roll, a calibration roll counter for the pulses from said calibration roll pulse tachometer, means responsive to said strip reaching constant speed for simultaneously initiating counting by said measuring roll pulse counter and said calibration roll pulse counter, means responsive to said calibration roll counter accumulating a preset number of pulses representing movement of the circumference of said calibration roll through a unit distance for stopping said measuring roll pulse counter, and means for changing the roll diameter compensation factor count preset in said unit length downcounter to the number of pulses accumulated in said measuring roll pulse counter.

20. In the method of measuring the length of a strip wherein a measuring roll in engagement with the strip is operatively connected to a measuring roll pulse tachometer, the steps of counting the number of pulses generated by said measuring roll pulse tachometer in a unit length counter, resetting said unit length counter to its initial state after a predetermined roll compensation factor number of pulses have been counter therein representing unit strip length and again initiating said pulse counting step, counting the number of times said resetting step occurs as an indication of the total length of said strip, measuring the lineal movement of said strip through unit distance when said strip is at running speed, accumulating the pulses generated by said measuring roll pulse tachometer during said measuring step while said strip is moving through said unit distance, and changing said predetermined roll diameter compensation factor number to the number of pulses accumulated in said accumulating step.

21. In the method of claim 20 wherein said unit length counter is a presettable downcounter, and said resetting step includes presetting said unit length downcounter to said predetermined roll diameter factor number each time it counts backwards to zero.

22. In the method of claim 20 wherein said step of measuring movement of said strip through unit distance includes engaging said strip with a calibration roll operatively connected to a calibration roll pulse tachometer, initiating accumulating of pulses from said calibration roll pulse tachometer when said strip reaches constant speed, and stopping said accumulating after a predetermined calibration setpoint number of pulses have been accumulated corresponding to movement of the circumference of said calibration roll through said unit distance.

23. In the method of claim 21 wherein said predetermined roll diameter compensation factor number is held in a calibration constant storage register coupled to said presettable downcounter, and said changing step includes changing the count held in said calibration constant storage register to the number of pulses accumulated in said pulse accumulating step.

24. In the method of claim 23 wherein said pulse accumulating step includes counting the number of pulses generated by said measuring roll pulse tachometer in a measuring roll pulse counter during said unit distance measuring step, and said changing step includes transferring the count accumulated in said measuring roll pulse counter to said calibration constant storage register.

25. In the method of claim 24 wherein said step of measuring movement of said strip through unit distance includes engaging said strip with a calibration roll operatively connected to a calibration roll pulse tachometer, initiating accumulating of pulses from said calibration roll pulse tachometer in a calibration roll pulse counter when said strip reaches constant speed and simultaneously initiating accumulating pulses by said measuring roll pulse counter, and stopping said accumulating and resetting said calibration roll pulse counter to its initial state after a calibration setpoint number of pulses have been accumulated in said calibration roll pulse counter representing movement of the circumference of said calibration roll through said unit distance.

26. In the method of claim 24 and including the steps of comparing the number of pulses counted by said measuring roll pulse counter during each unit length measuring step with the number of pulses counter during the previous unit length measuring step, and wherein said count transferring step is performed after said comparing step indicates that the number of pulses counted by said measuring roll pulse counter has been substantially the same for a plurality of successive unit distance measuring steps.

27. In the method of measuring the length of a strip wherein a measuring roll in engagement with the strip is operatively connected to a measuring roll pulse tachometer, the steps of
  incrementing an up-down counter with the pulses from said measuring roll pulse tachometer,
  measuring the lineal movement of said strip through unit distance when said strip is at running speed,
  accumulating the pulses generated by said measuring roll pulse tachometer during said measuring step while said strip is moving through said unit distance,
  presetting a presettable unit length downcounter to the number of pulses accumulated during said accumulating step and resetting it to said number each time it proceeds backward to zero,
  stopping said incrementing of said up-down counter when said strip reaches running speed and initiating decrementing of said up-down counter with pulses from a high frequency pulse source and also initiating decrementing of said presettable unit length downcounter with both pulses from said high frequency pulse source and pulses from said measuring roll pulse tachometer,
  stopping the decrementing of said up-down counter and said presettable unit length downcounter by said pulses from said high frequency pulse source when said up-down counter proceeds backward to zero, and
  counting the number of times said resetting step occurs as an updated indication of total strip length.

28. In a strip length measuring system having a measuring roll engaging the strip operatively connected to a measuring roll pulse tachometer,
  a measuring roll pulse counter for the pulses from said measuring roll pulse tachometer,
  means for measuring movement of said strip through a unit distance,
  an up-down counter,
  means responsive to said strip entering said length measuring system for initiating incrementing of said up-down counter with pulses from said measuring roll pulse tachometer,
  a presettable unit length downcounter,
  means to preset said unit length downcounter each time it proceeds backwards to zero to the number of counts accumulated by said measuring roll counter during measurement of said unit distance by said measuring means,
  a total length counter connected to be incremented each time said unit length downcounter is preset,
  a pulse clock,
  means responsive to said strip reaching running speed for stopping incrementing of said up-down counter and for decrementing said up-down counter with pulses from said clock and for also decrementing said unit length downcounter with both pulses from said clock and pulses from said measuring roll tachometer, and
  means responsive to said up-down counter proceeding backward to zero to stop decrementing of said unit length downcounter by pulses from said clock.

29. In a strip length measuring system in accordance with claim 28 wherein said unit distance measuring means includes a calibration roll in engagement with said strip, a calibration roll tachometer operatively connected to said calibration roll, and a presettable calibration roll pulse counter preset to the calibration setpoint number of pulses generated by said calibration roll pulse tachometer when the circumference of said calibration roll moves said unit distance.

30. In a strip length measuring system in accordance with claim 29 and including
  means for generating a unit distance signal and for resetting said calibration roll pulse counter to said preset value each time it proceeds backwards to zero,
  a temporary storage register coupled to said measuring roll pulse counter,
  means responsive to said unit distance signal for comparing the counts in said measuring roll pulse counter and said temporary storage register, and
  means for transferring the contents of said measuring roll pulse counter to said temporary storage register when the counts accumulated therein are dissimilar.

31. In a strip length measuring system in accordance with claim 30 and including
  a calibration constant storage register coupled to said temporary storage register, and
  means responsive to the counts accumulated in said measuring roll pulse counter and said temporary storage register being similar during generation of a plurality of successive unit distance signals for transferring the contents of said temporary register to said calibration constant storage register as an updated roll diameter compensation factor and wherein said presettable unit length downcounter is coupled to said calibration constant storage register.

32. In a strip length measuring system in accordance with claim 31 and including
  means for generating a running speed signal when said strip reaches running speed, and
  means responsive to said running speed signal for presetting said presettable unit length downcounter to the count stored in said calibration constant storage register.

33. In a strip length measuring system in accordance with claim 32 wherein said means for generating a running speed signal includes
  means for generating a compare signal in response to said unit distance signal when the counts in said measuring roll pulse counter and said temporary storage register are similar and for generating a non-compare signal when said counts are dissimilar, and
  an upcounter connected to be incremented by each said compare signal and to be reset to its initial state by each said non-compare signal and adapted to generate said running speed signal when it proceeds forward to a predetermined count.

34. In a strip length measuring system having a measuring roll engaging the strip operatively connected to a measuring roll pulse tachometer, a presettable unit length downcounter for the pulses from said measuring roll pulse tachometer, a total length counter, means for incrementing said total length counter and for presetting said unit length downcounter to a roll diameter compensation factor counter each time it proceeds backward to zero, a measuring roll pulse counter for the pulses from said measuring roll pulse tachometer, a calibration roll in contact with said strip, a calibration roll pulse tachometer operatively connected to said calibration roll, a calibration roll counter for the pulses from said calibration roll pulse tachometer, means responsive to said strip reaching constant speed for simultaneously initiating counting by said measuring roll pulse counter and said calibration roll pulse counter, means responsive to said calibration roll pulse counter accumulating a predetermined calibration setpoint number of pulses corresponding to movement of the circumference of said calibration roll through a unit distance for stopping said measuring roll pulse counter, and means for changing the roll diameter compensator factor count preset in said unit length downcounter to the number of pulses accumulated in said measuring roll pulse counter while said calibration roll pulse counter is accumulating said predetermined calibration setpoint number of pulses.

* * * * *

PO-1050
(5/69)

UNITED STATES PATENT OFFICE
CERTIFICATE OF CORRECTION

Patent No. 3,824,694          Dated July 23, 1974

Inventor(s) Lawrence M. Lesperance, Hugh S. Drewry, and Gunars Vegners

It is certified that error appears in the above-identified patent and that said Letters Patent are hereby corrected as shown below:

Column 11, line 16, "acutation" should read --- actuation ---; line 24, --- pulse --- was omitted after "roll." Column 12, line 64, "preceeded" should --- proceeded ---. Column 14, line 1, --- unit --- was omitted after "said." Column 15, lines 45-46, --- pulse --- was omitted between "roll" and "counter." Column 16, line 64, "counter" should read --- counted ---.

Signed and sealed this 5th day of November 1974.

(SEAL)
Attest:

McCOY M. GIBSON JR.
Attesting Officer

C. MARSHALL DANN
Commissioner of Patents